July 11, 1967     L. H. MORIN     3,330,013
INTEGRAL SLIDE FASTENER
Filed April 14, 1965
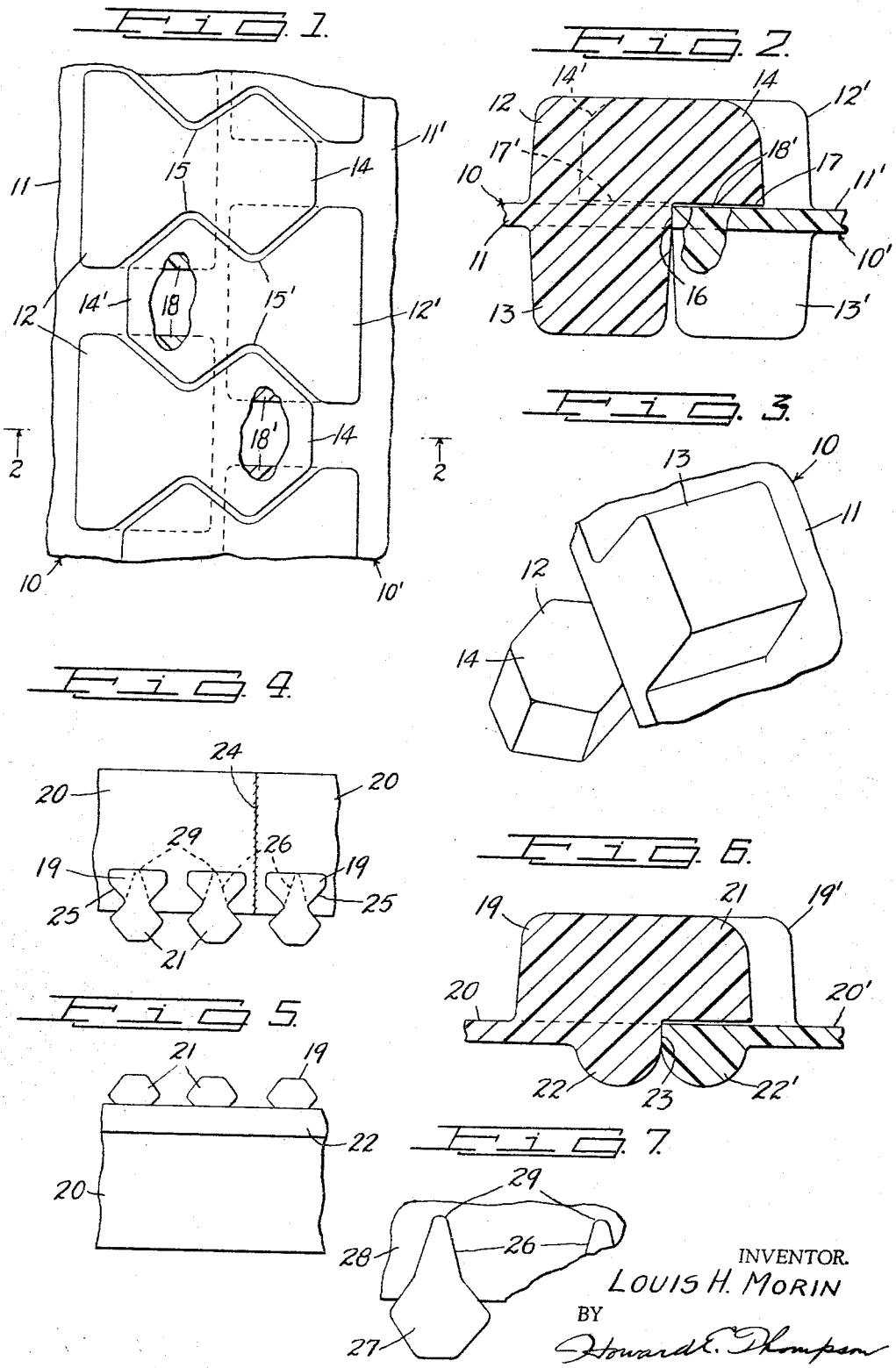
INVENTOR.
LOUIS H. MORIN
BY
Howard E. Thompson
ATTORNEY United States Patent Office 3,330,013
Patented July 11, 1967

3,330,013
INTEGRAL SLIDE FASTENER
Louis H. Morin, Bronx, N.Y.; Blanche Morin and J. R. Hanna, executors of said Louis H. Morin, deceased
Filed Apr. 14, 1965, Ser. No. 448,087
7 Claims. (Cl. 24—205.1)

This invention relates to separable fastener stringers formed of suitable plastic material, wherein the stringers include elongated tape members having scoop members spaced longitudinally of one end portion of the tape members and integral with said tape members in producing separable fastener stringers which are readily rejoinable when mismeshed.

More particularly, the invention deals with a stringer structure, wherein the scoop members of the unitary stringers can be of any type and kind, with scoop portions disposed at opposed sides of the tape members of the stringers or wherein one surface of the tape members of the stringers include reinforcing or stiffening ribs applied to Phantom-type of separable fasteners.

Still more particularly, the invention deals with separable fastener stringers of the character defined, wherein the stringers can be formed in predetermined lengths and these lengths joined by welding in formation of long stringer lengths. Further, the invention deals in the method of producing stringers of the character defined.

The novel features of the invention will be best understood from the following description when taken together with the accompanying drawing, in which certain embodiments of the invention are disclosed and, in which, the separate parts are designated by suitable reference characters in each of the views and, in which:

FIG. 1 is an enlarged plan view of one surface of a pair of coupled stringers illustrating the scoop engagement of the stringers one with respect to the other.

FIG. 2 is a section generally on the line 2—2 of FIG. 1.

FIG. 3 is a detailed perspective view showing one of the scoop members illustrated in FIGS. 1 and 2, including a portion of the integral tape member of the scoop.

FIG. 4 is a plan view of short lengths of two modified forms of stringers, diagrammatically illustrating the welding of two stringer lengths and indicating in dotted lines a modified structure.

FIG. 5 is a plan view of an opposed surface of a stringer, similar to the stringers shown in FIG. 4.

FIG. 6 is a view similar to the showing in FIG. 2, but illustrating the stringer structures of FIGS. 4 and 5 in coupled relationship with each other and on a larger scale than the showing in FIGS. 4 and 5; and FIG. 7 is a detailed view of a small portion of a modified form of stringer showing one complete scoop member and a part of an adjacent member.

In illustrating one adaptation and use of my invention, I have diagrammatically illustrated a method of producing separable fastener stringers including integral scoop and tape members, wherein the stringers are molded in predetermined lengths and, when desired, these lengths can be joined by welding in producing longer lengths. However, separable fastener stringers of the character defined can be produced as continuous extrusions of long lengths and cut to predetermined usable stringer lengths or in simultaneously forming two long stringer lengths and joining the same directly after the formation of the stringers in producing joined stringer lengths, as more clearly defined in a companion application filled of equal date herewith.

Still further, stringers of the character defined can be produced in a disc-type extruder, again, as disclosed in another companion application filled of equal date herewith.

In the diagrammatic illustrations of FIGS. 1, 2 and 3 of the drawing, I have shown at 10, 10' two similar stringers formed of suitable plastic material such, for example, as polypropylene. This particular type of plastic is desirable from the standpoint of its flexible characteristics and strength and, further, from the standpoint of resisting many conditions to which the separable fastener stringers are likely to be subjected in extensive uses of fasteners of the type and kind herein defined.

Each stringer 10, 10' employs a tape member 11, 11' and an integral center ledge-type of scoop structure defined by a member 12, 12' disposed on one surface of the tape and a member 13, 13' disposed upon the other surface thereof. The member 12, 12' includes a projecting coupling head 14, 14' and sides of the member 12, 12' include V-shaped recesses 15, 15' cooperating with the heads of the companion stringer in coupling and uncoupling the stringers, as with other fasteners will known in the art. In other words, the heads 14 of the members 12 operatively engage the receses 15' of the members 12' and vice versa.

Considering FIG. 3 of the drawing, it will be apparent that the center ledge members as, for example, the member 13 is in direct alignment with the member 12, but disposed on the opposed surface of the tape member 10. When the stringers are coupled together, as seen in FIG. 2, the center ledge members 13, 13' abut, as seen at 16, and the tape members 11, 11' also abut at this edge. A slight clearance is provided between the lower surface 17, 17' of the heads 14, 14' and the portion of the tape member of the opposed stringers, as well as exposed surfaces of the shoulders or ledge portions 18, 18' of the members 13, 13', respectively. This is illustrated in the broken away portions of FIG. 1, as well as in the broken away portion of member 13', as seen in FIG. 2 of the drawing. The clearances provided at 17, 17' are simply to facilitate coupling engagement of the stringers, as well as the separation thereof.

At this time, it is pointed out that conventional type of sliders will be used to couple and uncouple the stringers and, as these are well known in the art, no detailed showing is made thereof. This will also apply to the illustration in FIGS. 4, 5 and 6 of the drawing. Here it is also well to bring out that, in view of the characteristics of the integral stringer structures, and particularly the tape members thereof, these tape members can be utilized in stitching or otherwise securing the stringers to the products, in connection with which the separable fastener is employed, as with other devices of this type and kind.

Keeping in mind that, with conventional separable fasteners employing the independent fabric or other tapes, the tape is one of the most extensive parts of the resulting fastener. With the use of tapes, the scoops of the fastener must then be formed and applied to the tape. With the present construction, the entire stringers of the fastener, that is to say, the tape members and the scoop members of the stringers are unitarily formed in a very simple and economical manner and, further, a more desirable separable fastener is provided by virtue of the flexibility thereof and the ability of rejoining a mismeshed fastener.

Turning now to the illustration in FIGS. 4 to 6, inclusive, here are illustrated stringers employing the phantom-type of scoops 19, in other words, the scoop members 19 are disposed upon one surface of the tape member 20. In FIG. 6 of the drawing, the members 19 and 20 of one stringer, such as shown in FIGS. 4 and 5, are illustrated. The companion stringer is identified by the scoop members 19' and the tape member 20' and, in FIG. 6, the two stringers are shown in coupled relationship to each other, as in the showing in FIG. 2.

The members 19, 19' have coupling heads as, for example, the heads 21 shown in FIGS. 4 and 5, which project beyond the edges of the tape member 20, similar to the showing in FIGS. 1 to 3, inclusive, and otherwise these scoop members are generally of the contour of the scoop members 12, 12'. Thus, no further detailed description need be given.

In some instances, the tape members will be flat on the surfaces thereof opposed to the surfaces upon which the scoop members 19, 19' are arranged. However, in the present illustration, elongated reinforcing ribs or beads 22, 22' are employed on these opposed surfaces, the beads being arranged at the edges of the tape members which abut when the stringers are coupled together, as indicated at 23 in FIG. 6 of the drawing.

With separable fasteners of the type and kind under consideration, substantially sealed couplings can be provided between the coupled stringers which would be extremely desirable in many uses of separable fasteners, particularly wherein liquid and airtight closures would be desirable. In other words, the abutment, as at 16 FIG. 2, and as at 23 FIG. 6, can be a pressure abutment, in which there would be a very positive tensional coupling engagement between the interengaged scoops. For sake of clarity in illustration, a decided clearance is shown in FIG. 1 between the engaged scoops or, in other words, between the heads 14, 14' and the sockets 15', 15. Where seals are not essential, slight clearances would generally be provided between the coupled scoops but, in requiring the seal, the engagement of the scoops will be tensional to maintain adjacent edges of the stringers in the abutting engagement with each other.

In FIG. 7 of the drawing, I have shown a modified form of stringer, the general appearance of which will be clearer from the dotted line showing of the modification in FIG. 4 of the drawing. Considering FIG. 4, the inner portions 25 of the scoop members 19 are relatively wide and, in fact, substantially of the same width as the coupling heads 21. However, in dotted lines is shown a varied form of inner portion at 26, as on scoop members 27 applied to the tape member 28 of the stringer shown in FIG. 7. With this construction, it will appear that the inner contracted ends 29 of 26 become widely spaced on the tape member 28. This provides a greater degree of resiliency and flexibility in the coupling and uncoupling of stringers, which is desirable, particularly when the plastic material employed in the stringer is restricted as to its extensibility and flexibility.

In the molding of predetermined stringer lengths, as previously described in one method of carrying my invention into effect, each molded tape member can have a length incorporating integrally therewith a predetermined number of scoop members and standardized short lengths can accordingly be produced. However, when longer lengths of stringers are required, a number of molded stringer lengths can be joined by abutting and welding edges thereof, as diagrammatically seen at 24 in FIG. 4 of the drawing. Here, what is known as the Ultrasonic method of welding can be employed. However, in accordance with other methods which I employ and more specifically dealt with in the companion applications hereinbefore referred to, continuous formation of indefinite lengths of stringers can be produced and these long lengths cut into predetermined lengths desired for specific uses.

As and when stringers are produced in elongated lengths or when short lengths are assembled by welding, as in FIG. 4 of the drawing, in making up predetermined stringer or separable fastener lengths, the scoop members can be sheared off to provide the customary tape ends, as with other separable fasteners of the type and kind under consideration.

Having fully described my invention, what I claim as new and desire to secure by Letters Patent is:

1. A separable fastener of the character defined comprising a pair of plastic stringers adapted to be coupled and uncoupled, each stringer comprising a tape member and integral scoop members spaced longitudinally of and projecting from a surface of one edge portion of the tape member, the scoops of one stringer operatively engaging the scoops of the companion stringer in coupling said stringers, and each stringer including integral means projecting from the opposed surface of the tape member and alined with part of all of the scoop members of the stringer.

2. A separable fastener as defined in claim 1, wherein the stringers and said means abut substantially in alinement with the tape members of the stringers when a pair of stringers are coupled.

3. A separable fastener as defined in claim 1, wherein said means comprises longitudinally spaced members.

4. A separable fastener as defined in claim 1, wherein said means on the other surface of the tape member in each stringer comprises an integral bead extending longitudinally of that portion of the tape member to which the scoop members are integrally arranged.

5. A separable fastener as defined in claim 4, wherein the beads and stringers abut substantially in alinement with the tape members.

6. A separable fastener as defined in claim 3, wherein said spaced members are alined with and equal in length to the part of the scoop members having the greatest length longitudinally of the stringers.

7. A separable fastener as defined in claim 3, wherein sides of each scoop member include recesses, said spaced members including portions overlying said recesses, and said overlying portion of the spaced members of one stringer overlapping similar overlying portions of the scoop members of the other stringer when said stringers are coupled.

References Cited

UNITED STATES PATENTS

| 2,873,501 | 2/1959 | Renner. |
| 3,072,991 | 1/1963 | Alberts. |
| 3,141,217 | 7/1964 | Jones _____ 24—205.13 X |

FOREIGN PATENTS

| 255,023 | 7/1963 | Australia. |
| 586,581 | 10/1933 | Germany. |

BERNARD A. GELAK, *Primary Examiner.*